(12) United States Patent
Enomoto (10) Patent No.: US 12,521,928 B2
(45) Date of Patent: Jan. 13, 2026

(54) INJECTION MOLDING MACHINE AND METHOD OF CONTROLLING THE SAME

(71) Applicant: SHIBAURA MACHINE CO., LTD., Tokyo (JP)

(72) Inventor: Jun Enomoto, Numazu (JP)

(73) Assignee: SHIBAURA MACHINE CO., LTD., Tokyo (JP)

( * ) Notice: Subject to any disclaimer, the term of this patent is extended or adjusted under 35 U.S.C. 154(b) by 254 days.

(21) Appl. No.: 18/003,986

(22) PCT Filed: Jun. 29, 2021

(86) PCT No.: PCT/JP2021/024603
§ 371 (c)(1),
(2) Date: Jun. 12, 2024

(87) PCT Pub. No.: WO2022/004736
PCT Pub. Date: Jan. 6, 2022

(65) Prior Publication Data
US 2025/0187242 A1      Jun. 12, 2025

(30) Foreign Application Priority Data

Jul. 3, 2020   (JP) .............................. 2020-115634

(51) Int. Cl.
*B29C 45/77*   (2006.01)
(52) U.S. Cl.
CPC .... *B29C 45/77* (2013.01); *B29C 2945/76006* (2013.01); *B29C 2945/7612* (2013.01);
(Continued)

(58) Field of Classification Search
CPC .......... B29C 45/77; B29C 2945/76381; B29C 2945/76939
See application file for complete search history.

(56) References Cited

U.S. PATENT DOCUMENTS

| 5,738,809 A | 4/1998 | Hara et al. |
| 6,616,871 B1 | 9/2003 | Imura et al. |

(Continued)

FOREIGN PATENT DOCUMENTS

| CN | 1111367 A | 11/1995 |
| CN | 101607437 A | 12/2009 |

(Continued)

OTHER PUBLICATIONS

Office Action for Chinese Patent Application No. 202180054120.8, mailed Mar. 15, 2025, 22 pages.

(Continued)

*Primary Examiner* — James Sanders
(74) *Attorney, Agent, or Firm* — DLA Piper LLP (US)

(57) ABSTRACT

An injection molding machine according to the present embodiment includes an injecting device and a controlling unit, the injection device being configured to inject a material into molds, the controlling unit being configured to control the injecting device and control, based on a past speed setting of an injection speed set in past and a past speed detection result in a molding cycle performed in advance, an injection speed in an injecting process through which the injecting device injects the material into the molds, the past speed detection result being detected in past by a speed sensor configured to detect the injection speed.

11 Claims, 10 Drawing Sheets

(52) U.S. Cl.
CPC .............. *B29C 2945/76187* (2013.01); *B29C 2945/76381* (2013.01); *B29C 2945/76605* (2013.01); *B29C 2945/76665* (2013.01); *B29C 2945/76859* (2013.01); *B29C 2945/76939* (2013.01)

(56) References Cited

U.S. PATENT DOCUMENTS

| | | | |
|---|---|---|---|
| 2009/0302797 | A1 | 12/2009 | Nakagawa et al. |
| 2009/0315205 | A1 | 12/2009 | Koumaru |

FOREIGN PATENT DOCUMENTS

| | | |
|---|---|---|
| CN | 102959856 A | 3/2013 |
| CN | 109159392 A | 1/2019 |
| JP | H08-290449 | 11/1996 |
| JP | 2001-191383 | 7/2001 |
| JP | 2005128762 A | 5/2005 |

OTHER PUBLICATIONS

International Preliminary Report on Patentability in Application No. PCT/JP2021/024603, dated Jan. 12, 2023.
Written Opinion in Application No. PCT/JP2021/024603, dated Aug. 10, 2021.
International Search Report issued in PCT/JP2021/024603 dated Aug. 10, 2021 (2 pages).
Extended European Search Report for European Application No. 21832580.1, mailed Jul. 1, 2024, 07 pages.
Chinese Mechanical Engineering Society: "Case Studies of Generation CNC," China Science and Technology Press, Jun. 30, 2016, 52 pages.
Office Action for Chinese Patent Application No. 202180054120.8, mailed Sep. 9, 2025, 23 pages.
Shu Z., et al., "Machine Tool Product Innovation and Design," Southeast University Press, Sep. 30, 2014, 147 pages.

ACTUAL SPEED WAVEFORM COMPARISON

FIG. 6A

PRESSURE WAVEFORM COMPARISON

INJECTION MOLDING MACHINE AND METHOD OF CONTROLLING THE SAME

CROSS REFERENCE TO RELATED APPLICATIONS

This application is a U.S. National Stage Application of International Application No. PCT/JP2021/024603 filed Jun. 29, 2021, which claims priority from Japanese Patent Application No. 2020-115634 filed Jul. 3, 2020. The entirety of all the above-listed applications are incorporated herein by reference.

TECHNICAL FIELD

Embodiments of the present invention relate to an injection molding machine and a method of controlling the same.

BACKGROUND ART

In injection molding, low-pressure injection molding in which pressure is not much applied to material such as melted resin is performed in some cases. One of known examples of the low-pressure injection molding is a method that switches from speed control to pressure control halfway through an injecting process. For example, at injection start, speed control is performed so that actual injection speed becomes equal to a set speed value. Thereafter, when actual injection pressure moves toward a set pressure value that is set to be low, pressure control is performed so that the actual injection pressure does not exceed the set pressure value.

However, with the above-described molding method, the injection speed during pressure control potentially varies at each shot. Furthermore, due to such variance of the injection speed, the quality of an obtained molded product potentially differs for each shot.

CITATION LIST

Patent Literature

[Patent Literature 1] Japanese Patent Laid-open No. 2001-191383

SUMMARY OF INVENTION

Technical Problem

It is intended to provide an injection molding machine that can improve reproducibility of product quality and a method of controlling the same.

Solution to Problem

An injection molding machine according to the present embodiment includes an injecting device configured to inject a material into a mold, and a controlling unit configured to control the injecting device and control, based on a past speed setting of an injection speed set in past and a past speed detection result in a molding cycle performed in advance, an injection speed in an injecting process through which the injecting device injects the material into the mold, the past speed detection result being detected in past by a speed sensor configured to detect the injection speed.

DESCRIPTION OF EMBODIMENTS

Embodiments of the present invention will be described below with reference to the accompanying drawings. The present embodiments do not limit the present invention. The drawings are schematic or conceptual, and the ratio of parts and the like are not necessarily identical to those in reality. In the specification and the drawings, the same element as that already described with reference to a drawing is denoted by the same reference sign, and detailed description thereof is omitted as appropriate.

First Embodiment

Figure 1:
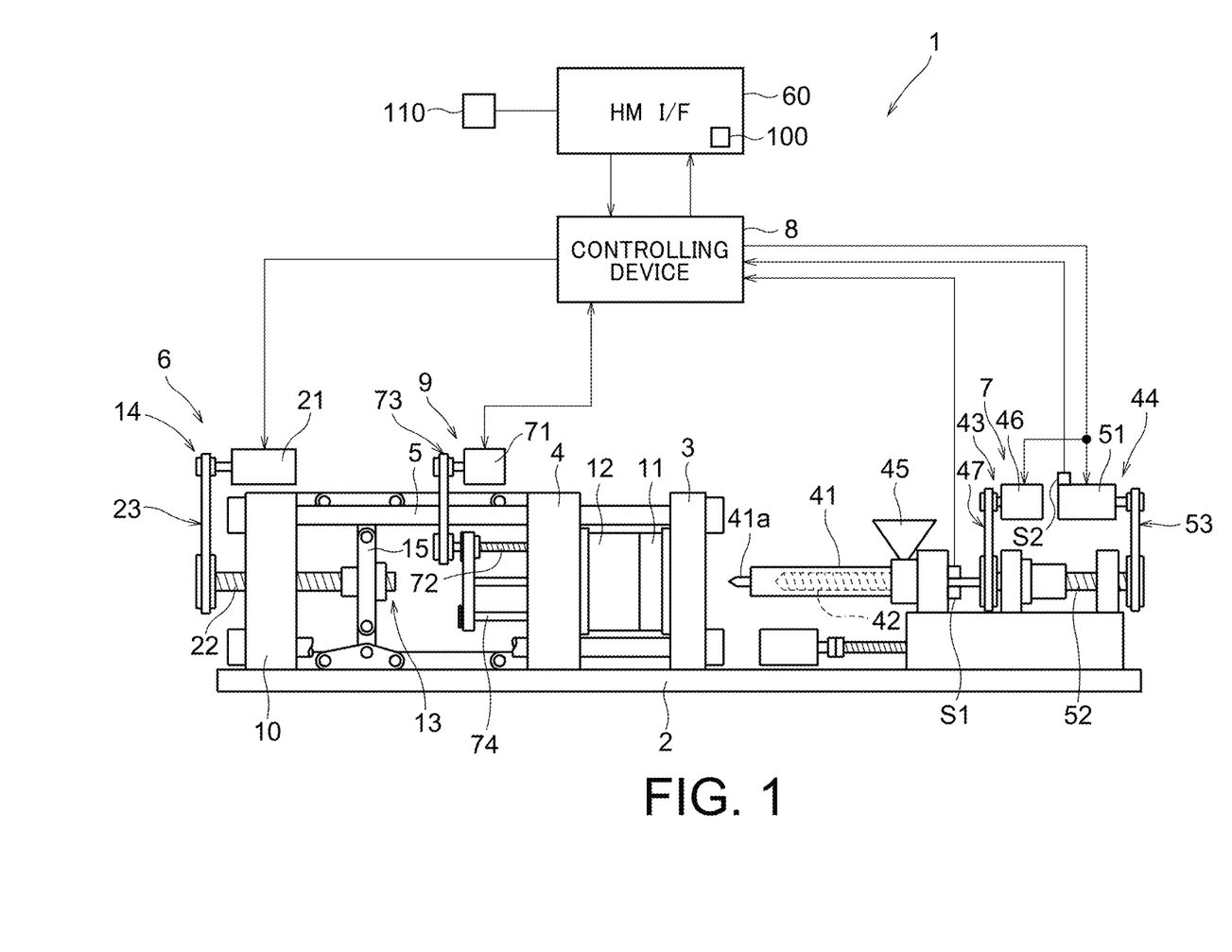
FIG. 1 is a block diagram illustrating an example of the configuration of an injection molding machine according to a first embodiment.

FIG. 1 is a block diagram illustrating an example of the configuration of an injection molding machine 1 according to a first embodiment. The injection molding machine 1 can repeatedly execute a series of injection molding operations and repeats, for example, a cycle operation in which a mold product is molded once. A cycle time is a time in which a series of cycle operations are executed.

The injection molding machine 1 includes a frame 2, a fixed board 3, a moving board 4, a tie bar 5, a clamp driving mechanism 6, an injecting device 7, a controlling device 8, an extruding mechanism 9, a human-machine interface 60, a storing device 110, an injection pressure sensor S1, and a screw position sensor S2.

The frame 2 is a base of the injection molding machine 1. The fixed board 3 is fixed on the frame 2. A fixed mold 11 as a first mold is attached to the fixed board 3. One end of the tie bar 5 is fixed to the fixed board 3, and the other end thereof is connected with a supporting board 10. The tie bar 5 extends from the fixed board 3 to the supporting board 10 through the moving board 4.

The moving board 4 is placed on a linear guide, a slipping plate, a roller, or the like (not illustrated) provided to the frame 2. The moving board 4 can be guided by the tie bar 5 or the linear guide and move toward or away from the fixed board 3. A moving mold 12 as a second mold is attached to the moving board 4. The moving mold 12 faces the fixed mold 11, moves toward the fixed mold 11 together with the moving board 4, and becomes combined with the fixed mold 11. A space corresponding to a product shape is formed between the moving mold 12 and the fixed mold 11 when the moving mold 12 and the fixed mold 11 are combined in contact.

The clamp driving mechanism 6 includes a toggle mechanism 13 and a toggle mechanism driving unit 14. The toggle mechanism driving unit 14 includes a clamping servomotor 21, a ball screw 22, and a transferring mechanism 23 to drive the toggle mechanism 13. A cross head 15 is attached to a leading end part of the ball screw 22. The cross head 15 moves toward or away from the moving board 4 as the ball screw 22 rotates. The transferring mechanism 23 transfers rotation of the clamping servomotor 21 to the ball screw 22 to move the cross head 15.

The toggle mechanism 13 is actuated as the toggle mechanism driving unit 14 moves the cross head 15. For example, as the cross head 15 moves toward the moving board 4, the moving board 4 moves toward the fixed board 3 and the molds 11 and 12 are clamped. Oppositely, as the cross head 15 moves away from the moving board 4, the moving board 4 moves away from the fixed board 3 and the molds 11 and 12 are opened.

The extruding mechanism 9 includes an extruding servomotor 71, a ball screw 72, a transferring mechanism 73, and an extruding pin 74 to remove a product from the moving mold 12 after molding. A leading end part of the extruding pin 74 penetrates to the inner surface of the moving mold 12. As the ball screw 72 rotates, the extruding pin 74 extrudes the product adhering to the inner surface of the moving mold 12. The transferring mechanism 73 transfers rotation of the extruding servomotor 71 to the ball screw 72 to move the extruding pin 74 in the right-left direction in FIG. 1 as the ball screw 72 rotates.

The injecting device 7 includes a heating barrel (band heater) 41, a screw 42, a measurement driving unit 43, and an injection driving unit 44. The heating barrel 41 includes a nozzle 41a through which resin being melted is injected into a cavity of the molds being clamped. The heating barrel 41 melts and stores resin from a hopper 45 by heating and ejects the melted resin through the nozzle. The screw 42 is provided to be able to move while rotating or not rotating inside the heating barrel 41. In a measurement process, the screw 42 rotates, melted resin is extruded to a leading end side of the heating barrel 41, and the screw 42 retracts being pressed by the extruded melted resin. The amount of melted resin ejected from the barrel 41 is measured and determined based on a travel distance by which the screw 42 retracts. In an injecting process, the screw 42 moves without rotating and ejects melted resin through the nozzle.

The measurement driving unit 43 includes a measuring servomotor 46, and a transferring mechanism 47 configured to transfer rotation of the measuring servomotor 46 to the screw 42. Resin is introduced from the hopper 45 into the heating barrel 41 as the measuring servomotor 46 is driven and the screw 42 is rotated in the heating barrel 41. The introduced resin is transferred to the leading end side of the heating barrel 41 while being heated and mixed. The resin is melted and stored at a leading end part of the heating barrel 41. The melted resin is ejected from the barrel 41 as the screw 42 is moved in a direction opposite to that in measurement. In this case, the screw 42 moves without rotating and extrudes the melted resin through the nozzle. Although melted resin is used as a molding material in the present embodiment, the molding material is not limited to melted resin but may be metal, glass, rubber, carbonized compound including carbon fiber, or the like.

The injection driving unit 44 includes an injecting servomotor 51, a ball screw 52, and a transferring mechanism 53. The screw 42 in the heating barrel 41 moves in the right-left direction in FIG. 1 as the ball screw 52 rotates. The transferring mechanism 53 transfers rotation of the injecting servomotor 51 to the ball screw 52. Accordingly, the screw 42 moves as the injecting servomotor 51 rotates. As extruded through the nozzle 41a by the screw 42, melted resin stored at the leading end part of the heating barrel 41 is ejected from the nozzle 41a.

The injection pressure sensor S1 detects filling pressure when the molds are filled with melted resin from the barrel 41, and dwell pressure in a dwell process. In the injecting process, the injection pressure sensor S1 detects injection pressure of melted resin material from the barrel 41 to the molds. In the dwell process, the injection pressure sensor S1 detects the dwell pressure of melted resin after dwell switching from speed control to pressure control.

The screw position sensor S2 detects the position of the screw 42. Since the screw 42 moves along with rotation of the injecting servomotor 51, the screw position sensor S2 may detect the position of the screw 42 based on the rotation speed and angular position of the injecting servomotor 51. The speed and acceleration of the screw 42 can be determined by detecting the position of the screw 42 in each predetermined control period.

The human-machine interface (HM I/F) 60 displays various kinds of information related to the injection molding machine 1. For example, the HM I/F 60 may include a display unit 100 and a keyboard or may be a touch panel display. A user can input setting of commands and the like related to operation of the injection molding machine 1 through the HM I/F 60. For example, the injection molding machine 1 molds a product for each execution of a molding cycle through the injecting process of injecting melted resin into the clamped molds, the dwell process of controlling the dwell pressure of the melted resin in the molds, and a cooling process of cooling the melted resin in the molds.

The controlling device 8 monitors sensor information received from various sensors (not illustrated) and controls the injecting device 7 based on the sensor information. The controlling device 8 also controls the screw 42 in accordance with the above-described setting values set through the HM I/F 60. In addition, the controlling device 8 causes the display unit 100 to display necessary data.

The storing device 110 stores a plurality of pieces of operation information of the injection molding machine 1. The operation information is information indicating operation of the molds 11 and 12, the clamp driving mechanism 6, or the injecting device 7. The storing device 110 may be provided inside the controlling device 8 or may be provided outside the injection molding machine 1.

Figure 2:
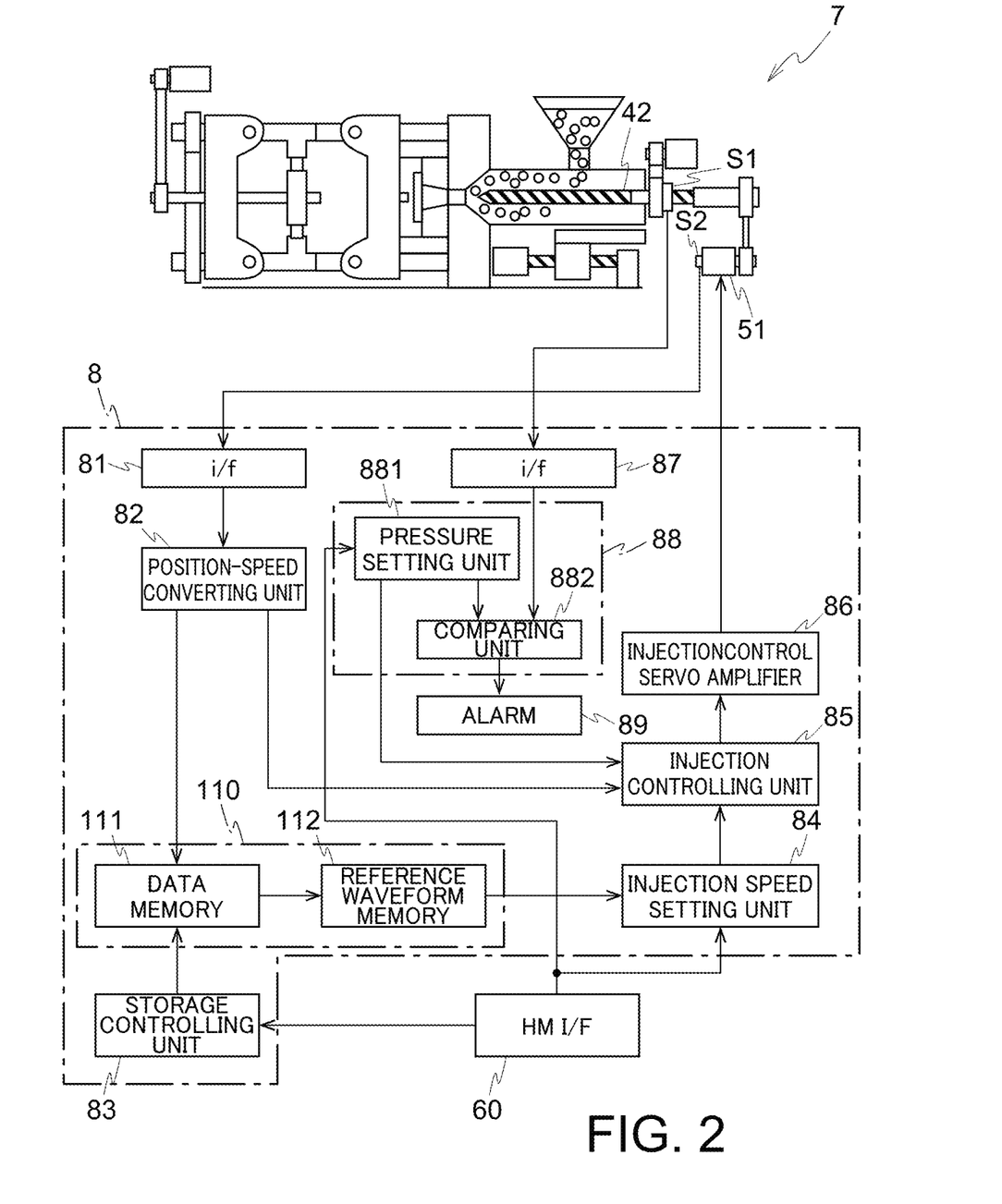
FIG. 2 is a block diagram illustrating an example of the configuration of a controlling device according to the first embodiment.

FIG. 2 is a block diagram illustrating an example of the configuration of the controlling device 8 according to the first embodiment.

The controlling device 8 includes an interface 81, a position-speed converting unit 82, a storage controlling unit 83, an injection speed setting unit 84, an injection controlling unit 85, an injection control servo amplifier 86, an interface 87, an injection pressure controlling unit 88, and an alarm 89. In the example illustrated in FIG. 2, the storing device 110 is provided inside the controlling device 8.

The position-speed converting unit 82 is connected with the screw position sensor S2 through the interface 81. The screw position sensor S2 is, for example, an encoder. In this case, the position-speed converting unit 82 converts an encoder position into an injection speed. For example, the position-speed converting unit 82 counts a filling time (injection time) based on signals from a sequencer (not illustrated). For example, the position-speed converting unit 82 outputs a waveform (temporal change) of the injection speed to the storing device 110 in a sampling mode in accordance with the injection time.

The storing device 110 includes a data memory 111 and a reference waveform memory 112.

The data memory 111 acquires the injection speed waveform transferred from the position-speed converting unit 82 in each molding cycle.

The reference waveform memory 112 as a storing unit stores a past speed setting and a past speed detection result in a molding cycle performed in advance. The "past speed setting" is setting of an injection speed set in past in the molding cycle performed in advance. The speed setting is also, for example, speed setting of the screw 42. The "past speed detection result" is a detection result detected in past in the molding cycle performed in advance by a speed sensor configured to detect the injection speed. The detection result of the injection speed is, for example, the injection speed waveform of one molding cycle. The speed sensor is, for example, the screw position sensor S2. The position of the screw 42 detected by the screw position sensor S2 is converted into the injection speed by the position-speed converting unit 82 as described above.

The storage controlling unit 83 stores the past speed setting and the past speed detection result in a molding cycle performed in advance in the storing device 110 (reference waveform memory 112). More specifically, the storage controlling unit 83 stores the past speed setting and the past speed detection result in the reference waveform memory 112 based on an operation of the user. The storage controlling unit 83 stores, in the reference waveform memory 112, for example, the injection speed waveform stored in the data memory 111 through the HM I/F 60. The storage controlling unit 83 stores, in the reference waveform memory 112, for example, the past speed setting input in a past molding cycle through the HM I/F 60. The storage controlling unit 83 may store, in the reference waveform memory 112, the past speed setting and the past speed detection result from a storing unit provided outside the injection molding machine 1. The HM I/F 60 includes, for example, a key input device and receives various kinds of operations from the user.

The injection speed setting unit 84 as a speed information acquisition unit acquires the past speed setting and the past speed detection result stored in the reference waveform memory 112 in advance. For example, the injection speed setting unit 84 automatically acquires the past speed setting and the past speed detection result and transfers the past speed setting and the past speed detection result to the injection controlling unit 85. The injection speed setting unit 84 may acquire, based on an operation of the user, the past speed setting and the past speed detection result stored in the storing device 110 (data memory 111).

The injection controlling unit 85 as a controlling unit controls the injecting device 7. The injection controlling unit 85 controls injection from the injecting device 7 by speed control and pressure control. The injection controlling unit 85 converts, for example, the past speed setting and the past speed detection result transferred from the injection speed setting unit 84 into a speed command and transfers the speed command to the injection control servo amplifier 86. Accordingly, the injection controlling unit 85 can control movement of the screw 42 through the injecting servomotor 51, thereby controlling injection from the injecting device 7. Details of the injection control by the injection controlling unit 85 will be described later with reference to FIGS. 3 and 4.

The injection pressure controlling unit 88 is connected with the injection pressure sensor S1 through the interface 87. The injection pressure controlling unit 88 includes a pressure setting unit 881 and a comparing unit 882.

Figure 3:
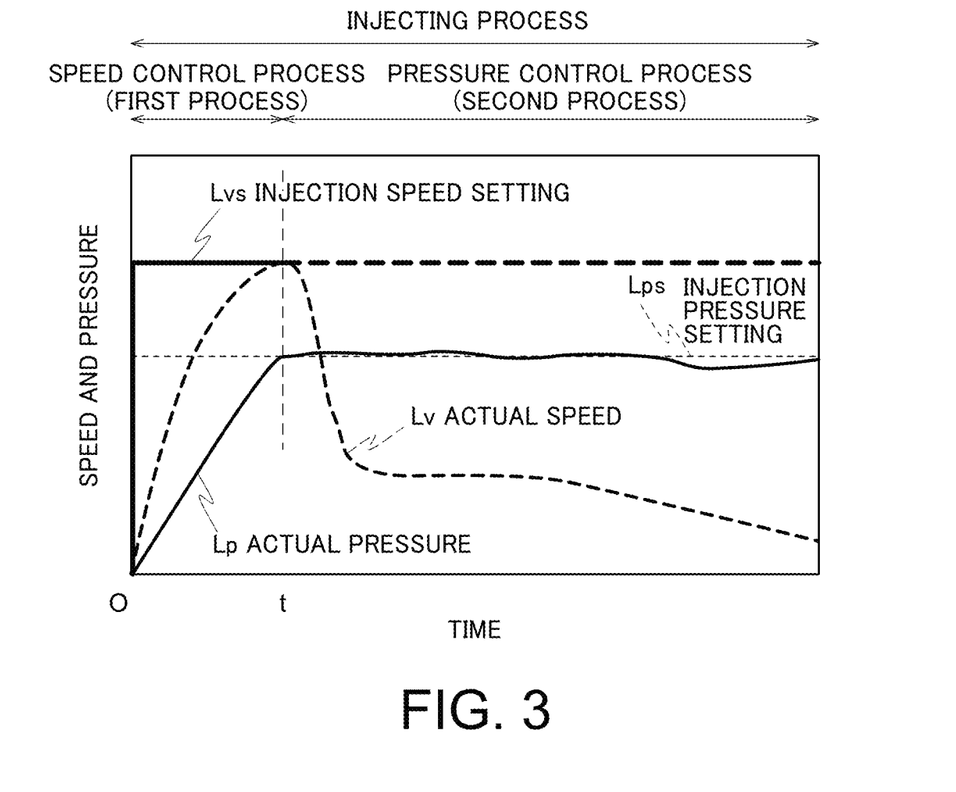
FIG. 3 is a graph illustrating an exemplary speed waveform and an exemplary pressure waveform in pressure-controlled injection.

The pressure setting unit 881 sets an injection pressure setting Lps and an upper limit change value of set pressure based on an operation of the user through the HM I/F 60 (refer to FIG. 3). The sum of the injection pressure setting Lps and the upper limit change value is referred to as an upper limit injection pressure setting Lps2 (refer to FIG. 4). The pressure setting unit 881 transfers the injection pressure setting Lps and the upper limit change value to the injection controlling unit 85. Accordingly, the injection controlling unit 85 can control injection by pressure control. The injection controlling unit 85 performs, for example, such pressure control that the injection pressure does not exceed the injection pressure setting Lps.

The comparing unit 882 compares a detected value (actual pressure) detected by the injection pressure sensor S1 with the upper limit injection pressure setting Lps2. The comparing unit 882 transfers a signal to the alarm 89 when the actual pressure exceeds the upper limit injection pressure setting Lps2.

The alarm 89 notifies that, for example, the actual pressure exceeds the upper limit injection pressure setting Lps2.

The injection control by the injection controlling unit 85 will be described below. The following description is made on injection control in the injecting process.

FIG. 3 is a graph illustrating an exemplary speed waveform and an exemplary pressure waveform in pressure-controlled injection. The vertical axis represents the injection speed and the injection pressure. The horizontal axis represents time. An origin O corresponds to the start of the injecting process. Thus, the speed and the pressure are substantially zero at the origin O.

The reference sign Lvs denotes an injection speed setting and is, for example, a setting value input to the injection speed setting unit 84. The reference sign Lv denotes the actual speed and is, for example, the injection speed obtained through conversion by the position-speed converting unit 82. The reference sign Lps denotes the injection pressure setting and is, for example, a setting value input to the pressure setting unit 881. The reference sign Lp denotes the actual pressure and is, for example, the injection pressure detected by the injection pressure sensor S1.

The pressure-controlled injection is a low-pressure injection molding method in which the injection speed (actual speed Lv) is controlled with the injection speed setting Lvs at beginning of the injecting process and pressure control is started halfway through the injecting process so that the actual pressure Lp does not exceed the injection pressure setting Lps as the upper limit value thereof. Thus, as illustrated in FIG. 3, the injecting process in the pressure-controlled injection is divided into a speed control process and a pressure control process. A timing t of switching between the speed control process and the pressure control process is, for example, a timing at which the actual pressure Lp increases and reaches the injection pressure setting Lps. The switching timing t may be the timing at which the actual pressure Lp reaches a predetermined pressure range including the injection pressure setting Lps.

In the pressure-controlled injection, molding is performed without applying high pressure to melted resin. Thus, it is possible to prevent damage on the molds due to overfilling. Since the injection molding machine does not need to be able to perform high-pressure filling, cost of the device is low. Since filling operation is performed at low pressure, running cost of the injection molding machine is reduced. Since injection is performed at low pressure, the sizes of the molds and peripheral instruments can be reduced, which also leads to reduction of cost and running cost of the device. Moreover, residual stress on a molded product can be reduced.

However, in the pressure-controlled injection, the injection speed in the pressure control process varies at each shot in some cases. This is thought to be because resin behavior in the molds 11 and 12 changes due to dependency of resin injection on pressure control. With the variance in the injection speed, the filling time varies at each shot and appearance quality potentially becomes unstable. In other words, with the variance in the injection speed, the quality of a molded product obtained at each shot differs in some cases. Thus, a non-defective product is not always obtained.

Figure 4:
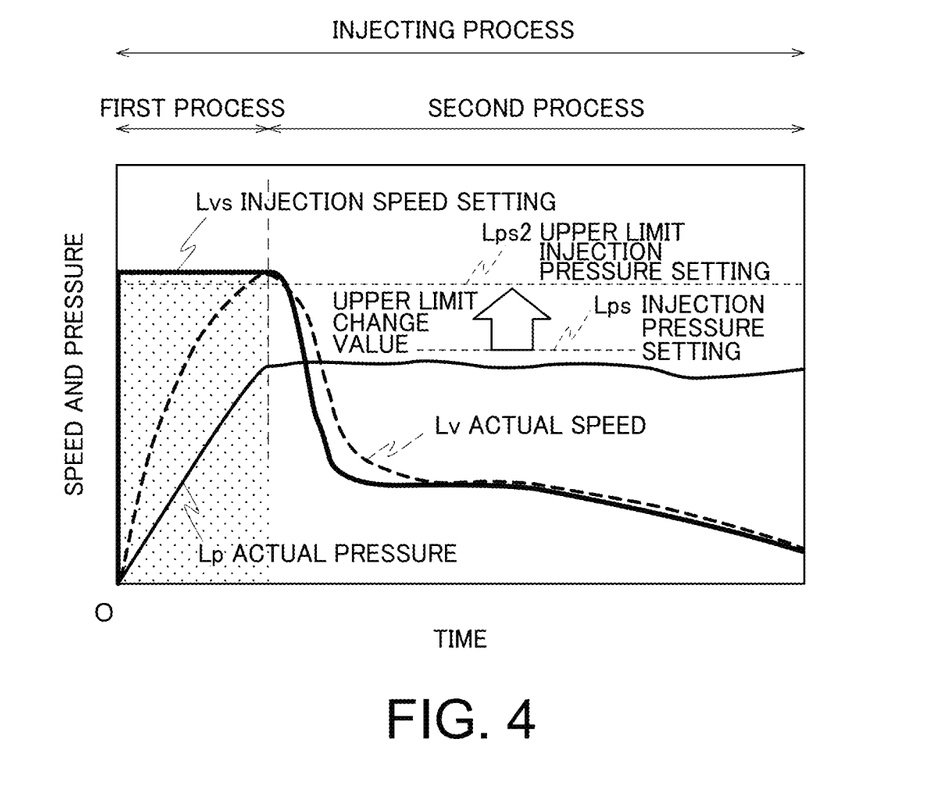
FIG. 4 is a graph illustrating an exemplary speed waveform and an exemplary pressure waveform in injection molding with reference to a molding cycle in FIG. 3.

Thus, the injection controlling unit 85 controls, based on the past speed setting of the injection speed set in past and the past speed detection result in a molding cycle performed in advance, the injection speed in the injecting process through which the injecting device 7 injects a material into the molds 11 and 12, the past speed detection result being detected in past by the speed sensor configured to detect the injection speed. First, as illustrated in FIG. 3, sampling of a reference speed pattern is performed by the pressure-controlled injection executed in advance. Thereafter, as illustrated in FIG. 4, molding operation is performed by using the past speed setting and the past speed detection result as the reference speed pattern. The injection controlling unit 85 performs speed control in the entire injecting process, and thus the variance in the injection speed at each shot can be reduced. As a result, reproducibility of the quality of a molded product in the low-pressure injection molding improves.

More specifically, the injection controlling unit 85 controls the injection speed in the injecting process based on the past speed setting and the past speed detection result in a molding cycle in which a molded product is a non-defective product among molding cycles performed in advance. In other words, a reference molding cycle is a molding cycle in which a non-defective product is obtained by the pressure-controlled injection.

(Speed Pattern Sampling by Pressure-Controlled Injection)

As illustrated in FIG. 3, in a first process in a molding cycle performed in advance, the injection controlling unit 85 controls the injection speed based on the past speed setting until a pressure detection result of a pressure sensor configured to detect the injection pressure reaches a predetermined upper limit value after the start of the injecting process. The "first process" continues from the start of the injecting process to a halfway point thereof. The first process in the pressure-controlled injection is the speed control process. The pressure sensor is, for example, the injection pressure sensor S1. The "predetermined upper limit value" is the injection pressure setting Lps. The past speed setting is the injection speed setting Lvs. The injection speed setting Lvs illustrated in FIG. 3 is a command value such as 100 mm/sec and has a waveform of a step-like shape (rectangular shape). The injection speed setting Lvs illustrated in FIG. 3 does not take into account falling and falling of speed in an actual speed command to a motor.

In the speed control process, the actual speed Lv increases from the start of the injecting process. The injection controlling unit 85 controls the injecting servomotor 51 to follow the injection speed setting Lvs. Feedback control, for example, such as PID control is used to control the injecting servomotor 51. Thus, the actual speed Lv falls behind the injection speed setting Lvs as an actual speed command. In the example illustrated in FIG. 3, the actual speed Lv reaches the injection speed setting Lvs at the end of the speed control process. The actual pressure Lp increases with the actual speed Lv from the start of the injecting process. The timing at which the actual pressure Lp reaches the injection pressure setting Lps is the switching timing t. Thereafter, the pressure control process is performed.

The timing at which the actual speed Lv reaches the injection speed setting Lvs is not limited to that in the example illustrated in FIG. 3 but changes depending on the increase speed of the actual pressure Lp in some cases. For example, when the increase speed of the actual pressure Lp is slow, the actual pressure Lp may reach the injection pressure setting Lps after the actual speed Lv reaches the injection speed setting Lvs and substantially matches the injection speed setting Lvs for a predetermined duration. The increase speed of the actual pressure Lp changes depending on, for example, the cavity volume of the molds, the size of the injection speed setting Lvs and the like.

In a second process in the molding cycle performed in advance, the injection controlling unit 85 controls the injection pressure so that the pressure detection result is equal to or smaller than the predetermined upper limit value. The "second process" is a process after the first process and continues from the halfway point of the injecting process to end thereof. The second process in the pressure-controlled injection is the pressure control process. The start of the pressure control process corresponds to the switching timing t. For example, the injection controlling unit 85 decreases the injection speed when the actual pressure Lp has become equal to or larger than the injection pressure setting Lps. The actual pressure Lp would continue increasing if the injection speed right after the speed control process is kept. Thus, the injection controlling unit 85 largely decreases the injection speed by pressure control. As illustrated in FIG. 3, the actual speed Lv abruptly decreases immediately after switching to the pressure control process. After the abrupt deceleration as well, the injection pressure increases due to continuation of injection. Thus, the actual speed Lv continues gradually decreasing so that the actual pressure Lp does not exceed the injection pressure setting Lps. In the pressure control process, the injection speed setting Lvs is ignored (refer to a dashed line in FIG. 3). The end of the pressure control process (the end of the injecting process) is set by, for example, the position of the screw 42. The dwell process is performed after the end of the pressure control process.

For example, the user sets the molding cycle illustrated in FIG. 3 as a reference pressure-controlled injection cycle. In this case, the storage controlling unit 83 stores the injection speed setting Lvs in the speed control process and the actual speed Lv in the pressure control process in the reference waveform memory 112.

(Molding Operation Using Speed Pattern)

FIG. 4 is a graph illustrating an exemplary speed waveform and an exemplary pressure waveform in injection molding with reference to the molding cycle in FIG. 3.

The reference sign Lps2 denotes an upper limit injection pressure setting. The upper limit injection pressure setting Lps2 is a value obtained by adding the upper limit change value to the injection pressure setting Lps as described above. Execution of pressure control with which the injection speed becomes unstable can be avoided by increasing an injection pressure setting value related to switching to the pressure control process. In other words, in molding operation after determination of the reference molding cycle, speed control can be executed in the entire injecting process. The upper limit injection pressure setting Lps2 is set to be sufficiently higher than the injection pressure setting Lps.

The injection controlling unit 85 controls the injection speed based on the past speed setting in the first process in the injecting process. More specifically, the first process includes the start of the injecting process. The same injection speed setting Lvs as the injection speed setting Lvs in the reference pressure-controlled injection illustrated in FIG. 3 is used in the first process. Thus, the actual speed Lv illustrated in FIG. 4 substantially matches the actual speed Lv illustrated in FIG. 3. Accordingly, the injection speed in the speed control process in the reference pressure-controlled injection can be substantially completely reproduced.

In the second process after the first process in the injecting process, the injection controlling unit 85 controls the injection speed based on the past speed detection result. Thus, in the second process, the actual speed Lv in the reference pressure-controlled injection illustrated in FIG. 3 is the injection speed setting Lvs illustrated in FIG. 4. In the reference pressure-controlled injection, the injection speed setting Lvs is ignored in the pressure control process. Thus, the past speed detection result as the actual speed Lv in the pressure-controlled injection is used in speed control. Accordingly, injection molding can be executed by speed control so that the pressure control process in the reference pressure-controlled injection is reproduced. As a result, the variance in the injection speed at each shot is reduced, and reproducibility of the quality of a molded product improves.

More specifically, the injection controlling unit 85 controls the injection speed in the injecting process by using the past speed setting and the past speed detection result as a speed setting of the injection speed. Unlike the past speed setting, the "speed setting" is a setting of the injection speed in a molding cycle being performed or to be performed. The past speed setting in the speed control process in the pressure-controlled injection is used for the speed setting in the first process as described above. The past speed detection result in the pressure control process in the pressure-controlled injection is used for the speed setting in the second process as described above. The injection controlling unit 85 controls the injection speed in the injecting process so that the injection speed follows the past speed setting and the past speed detection result. The injection controlling unit 85 performs feedback control such as PID control.

A method of controlling the injection molding machine 1 will be described below.

Figure 5:
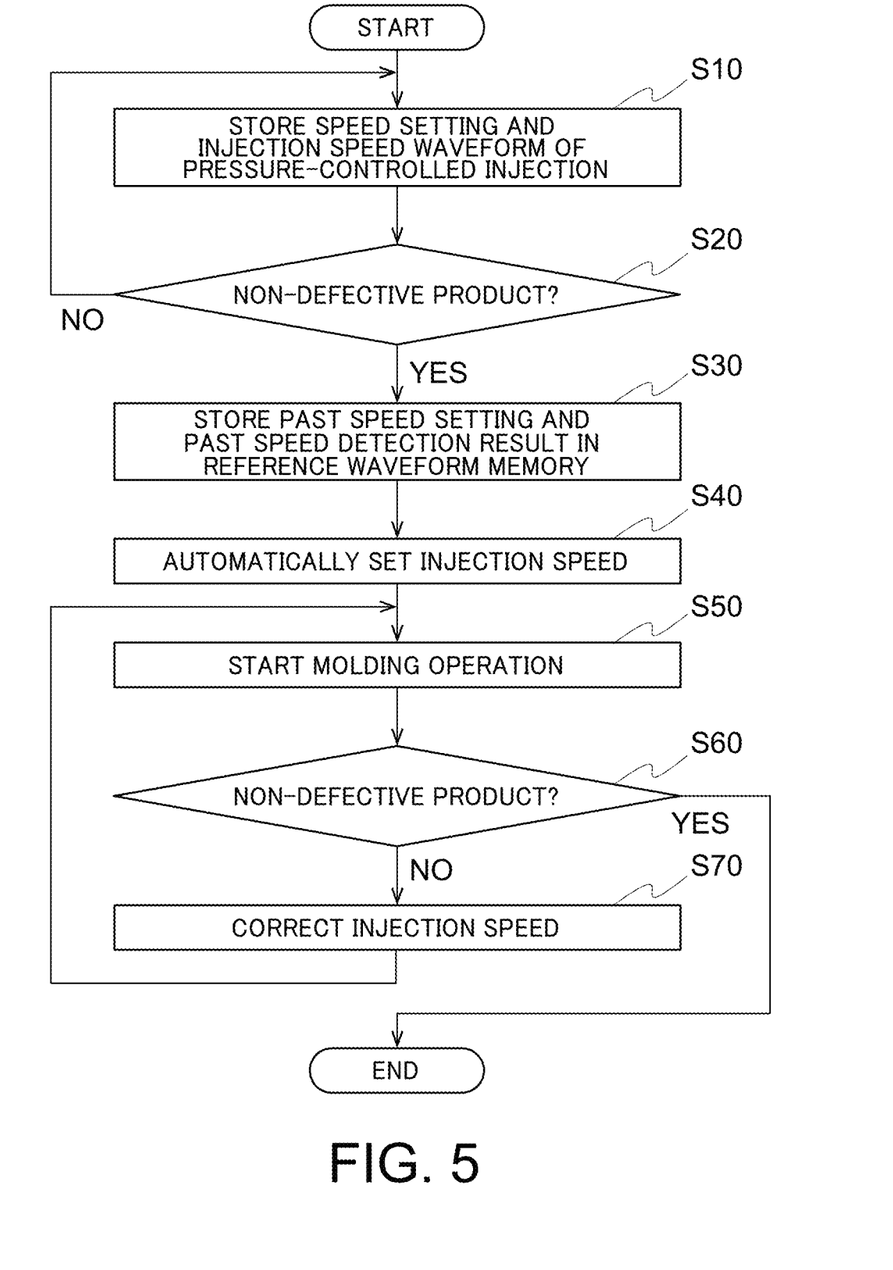
FIG. 5 is a flowchart illustrating an example of operation of the injection molding machine according to the first embodiment.

FIG. 5 is a flowchart illustrating an example of operation of the injection molding machine 1 according to the first embodiment.

First, the injection molding machine 1 executes the pressure-controlled injection, and the data memory 111 stores the injection speed waveform of the pressure-controlled injection (S10).

Subsequently, the user determines whether or not a molded product is a non-defective product (S20). When the molded product is not a non-defective product (NO at S20), step S10 is executed again. Thus, steps S10 and S20 are repeatedly executed until a non-defective product is obtained. Steps S10 and S20 are executed, for example, in each molding cycle.

When the molded product is a non-defective product (YES at S20), the storage controlling unit 83 stores the past speed setting and the past speed detection result in the reference waveform memory 112 (S30). For example, the user operates the storage controlling unit 83 through an operation of the HM I/F 60 and stores, in the reference waveform memory 112, the past speed setting set by the injection speed setting unit 84 and the past speed detection result stored in the data memory 111.

Subsequently, the injection speed setting unit 84 automatically sets the injection speed (S40). The injection speed setting unit 84 acquires and sets, as the speed setting in later molding operation, the past speed setting and the past speed detection result stored in the reference waveform memory 112.

Subsequently, the injection molding machine 1 starts molding operation based on the setting by the injection speed setting unit 84 (S50).

Subsequently, the user determines whether or not a molded product is a non-defective product (S60). When the molded product is not a non-defective product (NO at S60), the user corrects the injection speed (S70). In other words, the user adjusts the speed setting by the injection speed setting unit 84. Thereafter, step S50 is executed again. Thus, steps S50 to S70 are repeatedly executed until a non-defective product is obtained. Steps S50 to S70 are executed, for example, in each molding cycle.

When the molded product is a non-defective product (YES at S60), the user continues operation without change. Accordingly, mass production of the product is performed.

The pressure-controlled injection (step S10) and the molding operation (step S50) illustrated in FIG. 5 do not necessarily need to be performed through a series of operations. For example, the pressure-controlled injection may be separately performed before the molding operation, and the past speed setting and the past speed detection result obtained in the pressure-controlled injection may be used in the molding operation independently performed thereafter. Accordingly, when molds are frequently replaced along with change of molded products in multi-kind small-lot production, the past speed setting and the past speed detection result of the same molds can be reused. As a result, speed waveform sampling in the pressure-controlled injection can be omitted to improve manufacturing efficiency.

Figure 6A:
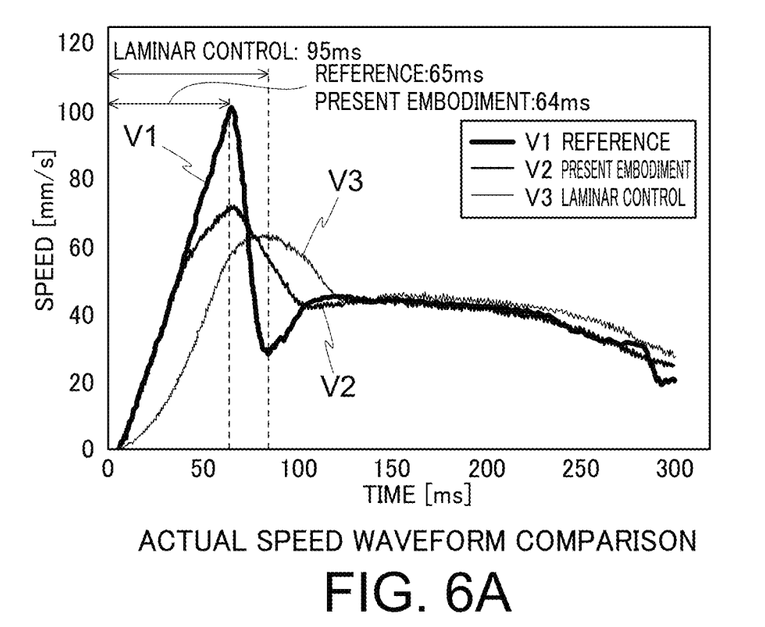
FIG. 6A is a graph illustrating exemplary speed waveforms in a plurality of control methods.
Figure 6B:
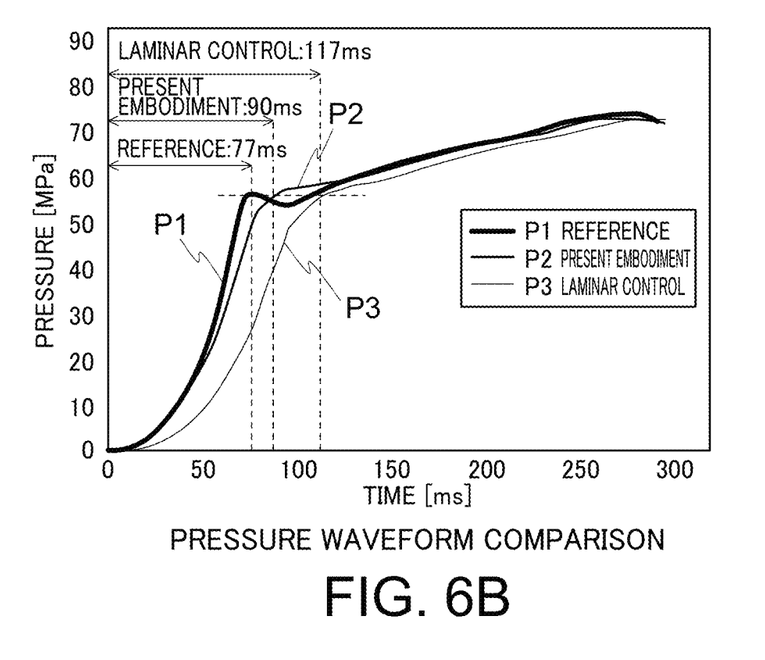
FIG. 6B is a graph illustrating exemplary pressure waveforms in a plurality of control methods.

FIG. 6A is a graph illustrating exemplary speed waveforms in a plurality of control methods. FIG. 6B is a graph illustrating exemplary pressure waveforms in a plurality of control methods. The speed and pressure waveforms illustrated in FIGS. 6A and 6B are actual values.

The reference sign V1 denotes the actual speed in the reference pressure-controlled injection. The reference sign V2 denotes the actual speed in the molding operation in the present embodiment. The reference sign V3 denotes the actual speed in laminar control as a comparative example. Like the actual speed Lv illustrated in FIGS. 3 and 4, the actual speeds V1 to V3 illustrated in FIG. 6A reach peaks and decrease thereafter.

The reference sign P1 denotes the actual pressure in the reference pressure-controlled injection. The reference sign P2 denotes the actual pressure in the molding operation in the present embodiment. The reference sign P3 denotes the actual pressure in the laminar control as a comparative example. Like the actual pressure Lp illustrated in FIGS. 3 and 4, the actual pressures P1 to P3 illustrated in FIG. 6B increase and become substantially constant thereafter. As illustrated in FIG. 6B, the actual pressures P1 to P3 gradually increase in some cases instead of becoming substantially constant.

The laminar control is a control method that controls the injection speed in the entire injecting process based on the past speed detection result in the pressure-controlled injection executed in advance. Thus, the past speed setting is not used in the laminar control. Details of the laminar control will be described later with reference to FIG. 7.

As illustrated in FIG. 6A, time until the actual speed V1 reaches highest speed is 65 ms approximately. Time until the actual speed V2 reaches highest speed is 64 ms approximately. These reaching times are close to each other. Thus, the actual speed V2 in the molding operation in the present embodiment undergoes temporal change similar to that of the actual speed V1 in the reference pressure-controlled injection.

At 0 ms to 40 ms approximately, the actual speed V2 substantially matches the actual speed V1. At 40 ms approximately to 65 ms approximately, the actual speed V2 is lower than the actual speed V1. This is because such a control method is used that starts deceleration before the first process ends to prevent the actual speed behind the setting from exceeding (overshooting) the maximum value of the injection speed setting. For example, when the first process ends after the actual speed Lv substantially matches (is stable at) the injection speed setting Lvs for a predetermined duration, the actual speed V2 in the first process substantially matches the actual speed V1. Alternatively, a control method that performs no deceleration in the first process may be used. In this case as well, the actual speed V2 in the first process substantially matches the actual speed V1.

At 65 ms approximately to 150 ms approximately, the actual speed V2 follows behind the actual speed V1. At 150 ms approximately or later, the actual speed V2 substantially matches the actual speed V1.

As illustrated in FIG. 6B, the actual pressure P1 in the reference pressure-controlled injection reaches a peak at 77 ms approximately. Time until the actual pressure P2 reaches the peak pressure of the actual pressure P1 is 90 ms approximately. Thus, the actual pressure P2 in the molding operation in the present embodiment undergoes temporal change similar to that of the actual pressure P1 in the reference pressure-controlled injection.

Thus, in the molding operation in the present embodiment, injection molding can be executed at the injection speed and the injection pressure close to those in the reference pressure-controlled injection.

As described above, according to the first embodiment, the injection controlling unit 85 controls the injection speed in the injecting process based on the past speed setting and the past speed detection result in a molding cycle performed in advance. Accordingly, the injecting process can be executed by speed control so that the injection speed and the injection pressure in the reference pressure-controlled injection in a past molding cycle are reproduced. As a result, mold protection, low-pressure molding, and low-residual-stress molding can be achieved, and reproducibility of the quality of a molded product in low-pressure injection molding can be improved by speed control.

Figure 7:
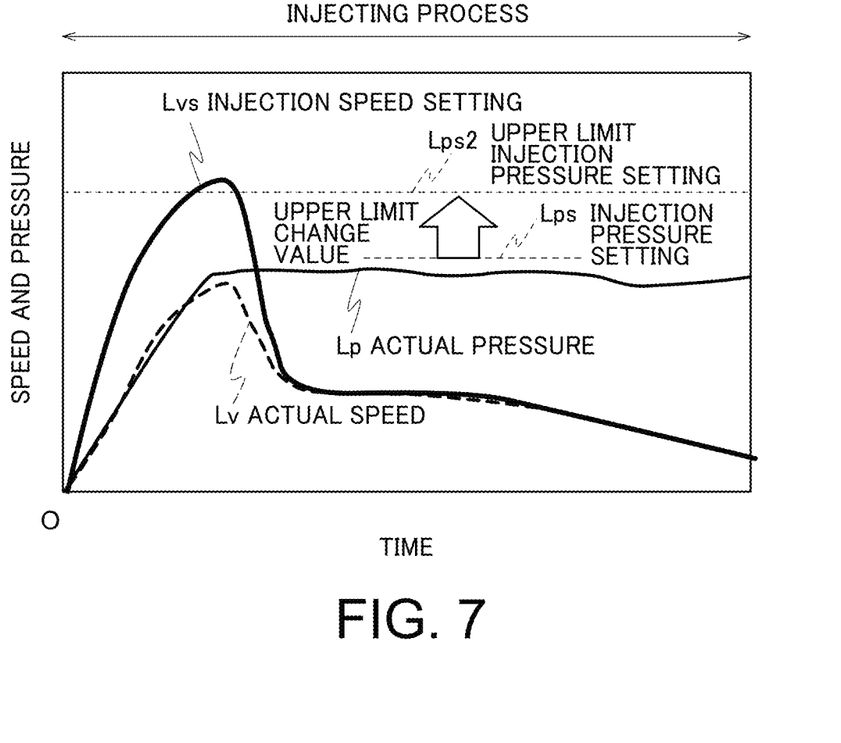
FIG. 7 is a graph illustrating an exemplary speed waveform and an exemplary pressure waveform in laminar control.

FIG. 7 is a graph illustrating an exemplary speed waveform and an exemplary pressure waveform in the laminar control.

As illustrated in FIG. 7, in the laminar control, the actual speed Lv in the entire injecting process in the reference pressure-controlled injection is set to the injection speed setting Lvs. Specifically, the laminar control is different from the molding operation in the present embodiment illustrated in FIG. 4 in that the past speed detection result is used for the speed setting at the start of the injecting process as well and the past speed setting is not used for the speed setting.

The actual speed Lv right after the start of the injecting process illustrated in FIG. 7 is lower than the actual speed Lv illustrated in FIGS. 3 and 4. This is because the actual speed in the reference pressure-controlled injection Lv is set to the injection speed setting Lvs in the laminar control. Accordingly, the actual speed Lv illustrated in FIG. 7 is affected by double control delay behind the injection speed setting Lvs in the reference pressure-controlled injection illustrated in FIG. 3. In the laminar control, since speed control is performed in the entire injecting process, reproducibility of the quality of a molded product at each shot is obtained as in the molding operation in the present embodiment. However, temporal change of the injection speed and the injection pressure in the laminar control is largely different from that of the reference molding cycle in some cases. In such a case, a mold defect that does not occur in the reference molding cycle potentially occurs.

As illustrated in FIG. 6A, time until the actual speed V3 reaches highest speed is 95 ms approximately. The time 95 ms approximately is longer than 65 ms approximately and 64 ms approximately, which are the reaching times of the actual speeds V1 and V2. In other words, the actual speed V3 in the laminar control is largely behind the actual speed V1 and the actual speed V2 at 0ms to 150 ms approximately.

As illustrated in FIG. 6B, time until the actual pressure P3 reaches the peak pressure of the actual pressure P1 is 117 ms approximately. The time 117 ms approximately is longer than 77 ms approximately and 90 ms approximately, which are the reaching times of the actual pressures P1 and P2. In other words, the actual pressure P3 in the laminar control is largely behind the actual pressure P1 and the actual pressure P2 at 0ms to 150 ms approximately.

However, in the present embodiment, the past speed setting is used in place of the past speed detection result for speed control in the first process. Accordingly, the actual speed Lv and the actual pressure Lp in the first process can be set to be substantially the same as those in the reference pressure-controlled injection. As a result, the actual speed Lv and the actual pressure Lp in the second process after the first process can be set to be close to those in the reference pressure-controlled injection. Thus, the quality of a molded product such as appearance quality can be improved as compared to the laminar control.

Second Embodiment

Figure 8:
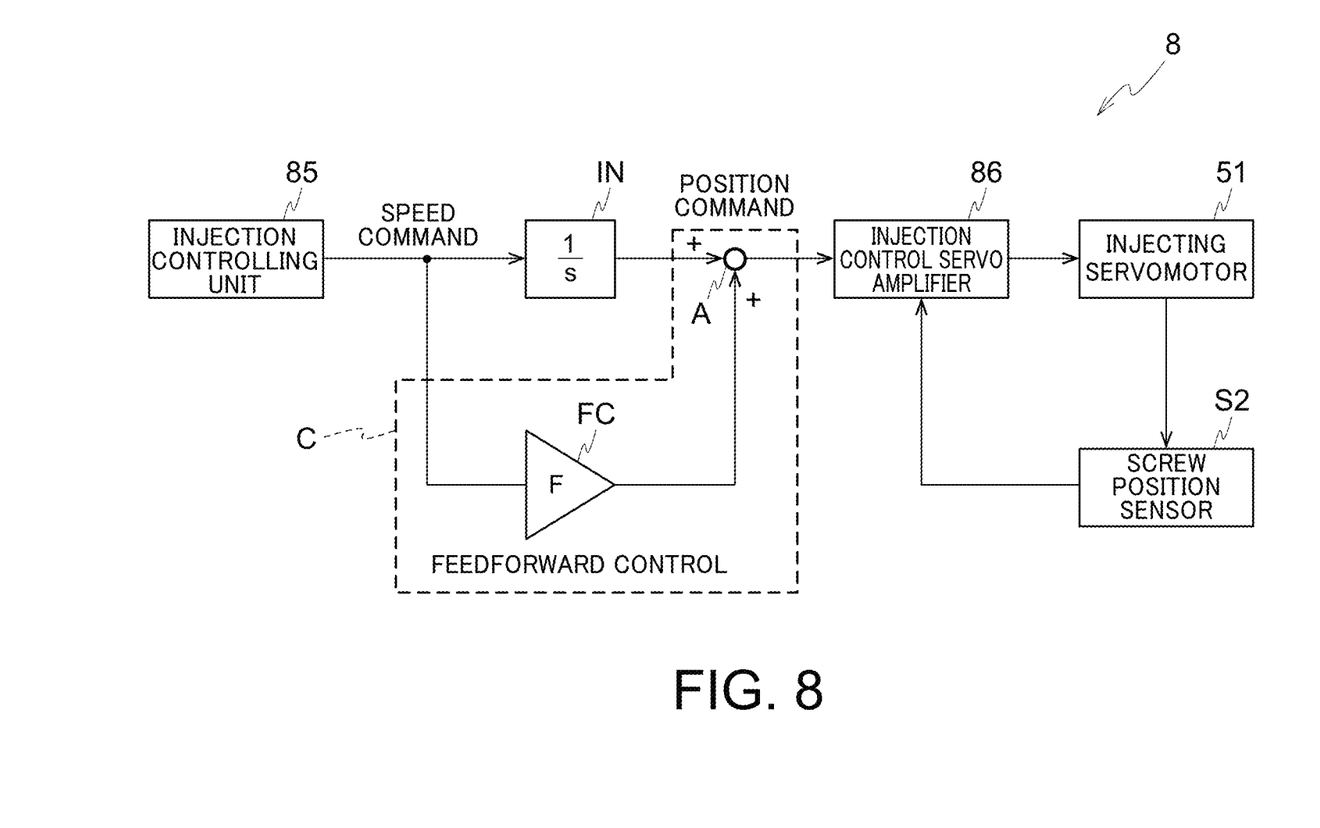
FIG. 8 is a block diagram illustrating the configuration of a controlling device according to a second embodiment.

FIG. 8 is a block diagram illustrating the configuration of the controlling device 8 according to a second embodiment. The second embodiment is different from the first embodiment in that feedforward control (FF control) is used for control of the injection speed in the second process.

In the molding operation of the first embodiment, the actual speed Lv in the second process follows behind the injection speed setting Lvs due to control delay as illustrated in FIG. 4. Thus, when the injection speed setting Lvs abruptly changes, for example, at the start of the second process, the actual speed Lv potentially does not match the injection speed setting Lvs. Thus, the actual speed Lv in the second process can be set closer to the injection speed setting Lvs by reducing the control delay by using the feedforward control. The feedforward control is not performed in the first process. Thus, the first process in the second embodiment is the same as in the first embodiment.

The controlling device 8 further includes an integrator IN and a command correcting unit C.

The injection controlling unit 85 generates a speed command of the screw 42 based on the past speed detection result set by the injection speed setting unit 84.

The integrator IN as a command converting unit converts the speed command generated by the injection controlling unit 85 into a position command by integrating the speed command. The integrator IN transfers the position command obtained by the conversion to the injection control servo amplifier 86.

The command correcting unit C corrects the position command of the screw 42 based on the speed command. More specifically, the command correcting unit C corrects the position command so that a speed detection result detected by the speed sensor approaches the past speed detection result. Unlike the past speed detection result, the "speed detection result" is the detection result of the injection speed in a molding cycle being performed or to be performed.

The command correcting unit C includes a feedforward controlling unit FC and an adder A.

The feedforward controlling unit FC calculates the product of the speed command of the screw 42 based on the past speed detection result and a predetermined value. The predetermined value is, for example, a feedforward control amount (FF amount) F illustrated in FIG. 8. For example, the feedforward control amount F is constant.

The adder A corrects the position command by adding the product of the speed command of the screw 42 based on the past speed detection result and the feedforward control amount F to the position command based on the past speed detection result. The adder A transfers the position command as the result of the addition to the injection control servo amplifier 86. Thus, the sum of the original position command and the feedforward control amount F is transferred as a command to the injection control servo amplifier 86. Accordingly, speed response in the second process improves and speed feedback delay due to control delay is reduced.

Figure 9:
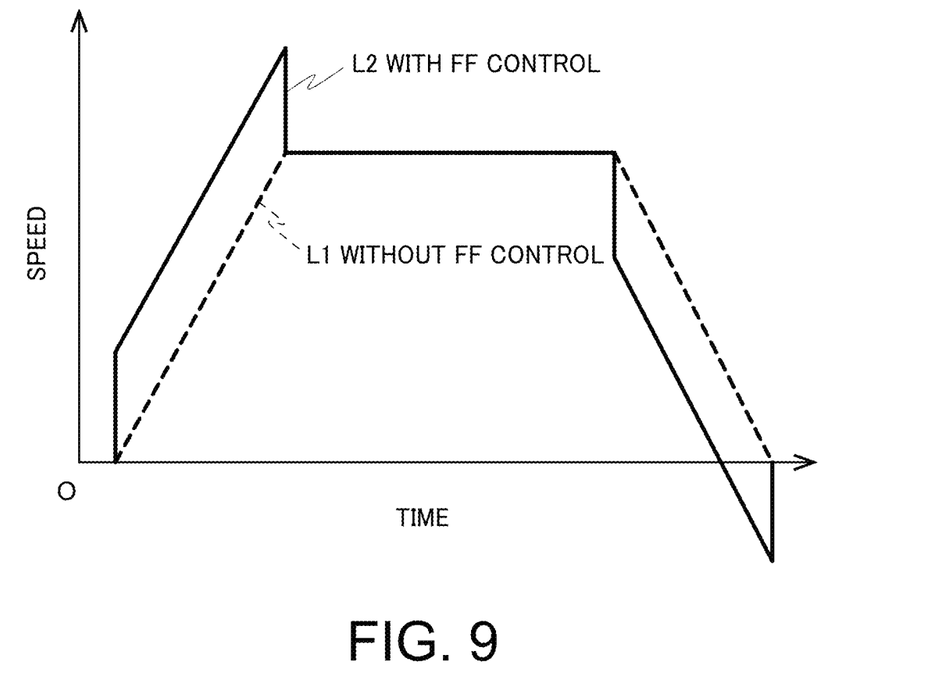
FIG. 9 is a graph illustrating an example of change of a speed command by feedforward control.

FIG. 9 is a graph illustrating an example of change of the speed command by the feedforward control. The speed command is obtained by differentiating the position command with respect to time.

The reference sign L1 (dashed line) denotes temporal change of the speed command when the feedforward control is not performed (when the feedforward control amount F is zero). As time elapses, the temporal change L1 increases, becomes constant, and decreases thereafter. The reference sign L2 (solid line) denotes temporal change of the speed command when the feedforward control is performed.

As illustrated in FIG. 9, the speed command when the feedforward control is performed has a speed waveform different from that of the original command speed due to the addition of the feedforward control amount F.

Figure 10:
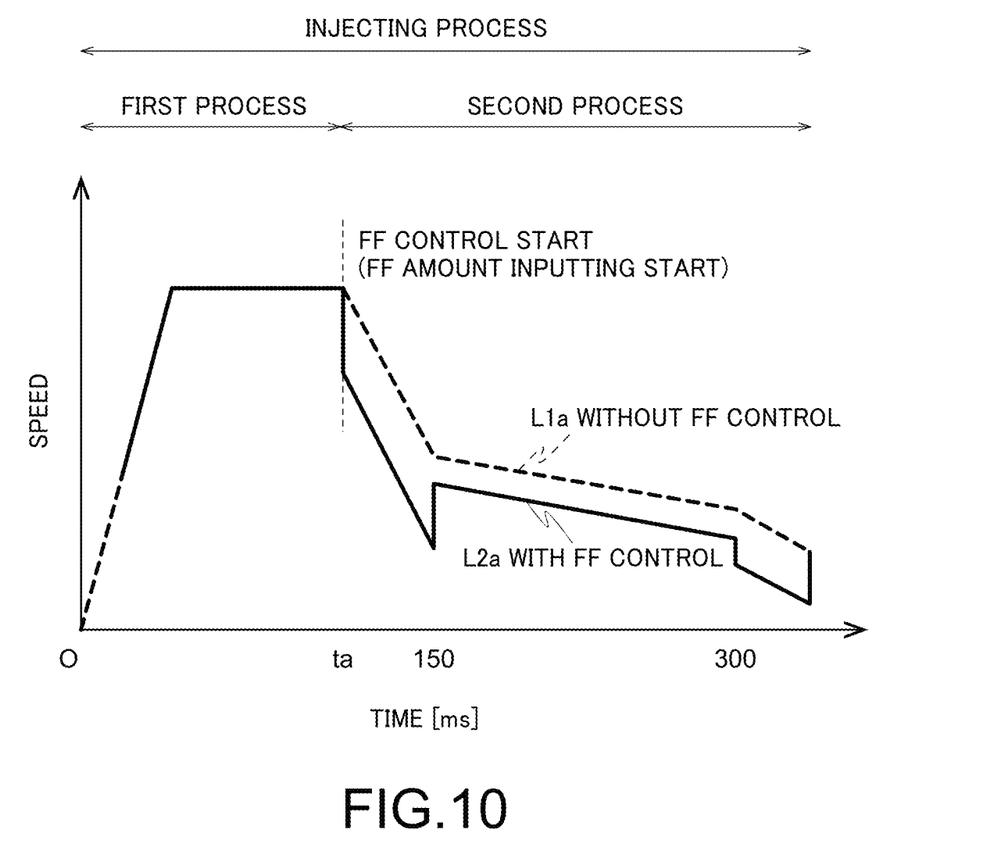
FIG. 10 is a graph illustrating an example of change of the speed command by the feedforward control in a second process.

FIG. 10 is a graph illustrating an example of change of the speed command by the feedforward control in the second process. Speed illustrated in FIG. 10 is the outline of temporal change of the speed command.

The reference sign L1$a$ (dashed line) denotes temporal change of the speed command when the feedforward control is not performed. Thus, the temporal change L1$a$ has the outline of the injection speed setting Lvs illustrated in FIG. 4. The temporal change L1$a$ takes into account rising of speed at the start of the injecting process. The reference sign L2$a$ (solid line) denotes temporal change of the speed command when the feedforward control is performed. Time of 150 ms to 300 ms illustrated in FIG. 10 corresponds to time illustrated in FIG. 6A.

In the example illustrated in FIG. 10, the feedforward control amount F in the first process is set to zero. Since the feedforward control is not performed, L2$a$ in the first process substantially matches L1$a$.

At a timing ta of switching between the first process and the second process, setting of the feedforward control amount F is input and the feedforward control is executed. Accordingly, L2$a$ becomes smaller than L1$a$. Thus, speed abruptly decreases right after the switching timing ta. Accordingly, control delay of speed feedback relative to the speed command is reduced, and for example, the actual speed Lv in the second process in FIG. 4 becomes closer to the injection speed setting Lvs.

At 150 ms, the difference between L1$a$ and L2$a$ decreases. This is because the value of the feedforward control amount F decreases. In the second process, setting of the feedforward control amount F may be changed in accordance with the magnitude of feedback control delay, in other words, the magnitude of change of the speed command.

The feedforward control amount F is set to be substantially equal to the deviation between the position command and the position feedback of the screw 42. The position feedback is, for example, the result of detection by the screw position sensor S2. Accordingly, feedback control delay is compensated (reduced). For example, a desired value with which feedback delay is appropriately canceled is set for the feedforward control amount F by the user in advance. For example, the user checks the actual speed in performance check of the injection molding machine 1 and determines the value of the feedforward control amount F. The feedforward control amount F may be stored in a storing unit such as the reference waveform memory 112.

In FIG. 10, the moving amount of the screw 42 is obtained by integrating speed. In the example illustrated in FIG. 10, the moving amount appears to be different between L1$a$ and L2$a$. However, precisely, when the feedforward control is started, a speed command in a direction in which the moving amount difference between Lia and L2$a$ is compensated by an amount corresponding to one control scanning right after the start is generated. As a result, the moving amount is substantially equal between L1$a$ and L2$a$. With one control scanning only, the generated speed command hardly affects variation of speed feedback.

In this manner, delay of the injection speed in the second process can be reduced by using the feedforward control. Not only delay of the injection speed but also delay of the injection pressure can be reduced. As a result, temporal changes of the actual speed Lv and the actual pressure Lp can be made further closer to the values thereof in a molding cycle as a reference (in non-defective product molding). Thus, the quality of a molded product can be further improved and made closer to quality in reference molding.

Any other configuration of the injection molding machine 1 according to the second embodiment is the same as the corresponding configuration of the injection molding machine 1 according to the first embodiment, and thus detailed description thereof is omitted.

The injection molding machine 1 according to the second embodiment can obtain the same effects as in the first embodiment.

At least part of the injection molding machine 1 according to the present embodiment and the method of controlling the same may be configured as hardware or software. In a case of software configuration, a computer program that achieves the function of at least part of the injection molding machine 1 and the method of controlling the same may be stored in a recording medium such as a flexible disk or a CD-ROM and may be read and executed by a computer. The recording medium is not limited to a detachable medium such as a magnetic disk or an optical disk but may be a fixed recording medium such as a hard disk device or a memory. The computer program that achieves the function of at least part of the injection molding machine 1 and the method of controlling the same may be distributed through a communication line (including wireless communication) such as the Internet. Moreover, the computer program in an encrypted, modulated, or compressed state may be distributed through a wired or wireless line such as the Internet or may be stored in a recording medium and distributed.

While certain embodiments of the present invention have been described, these embodiments have been presented by way of example only, and are not intended to limit the scope of the invention. These embodiments may be embodied in a variety of other forms; furthermore, various omissions, substitutions and changes may be made without departing from the spirit of the invention. These embodiments and their variations are included in the scope and spirit of the invention, as well as included in the invention described in the claims and the scope of its equivalents.

The invention claimed is:

1. An injection molding machine comprising:
an injecting device configured to inject a material into clamped molds; and
a controlling unit configured to control the injecting device and control, based on a past speed setting of an injection speed set in past and a past speed detection result in a molding cycle performed in advance, an injection speed in an injecting process through which the injecting device injects the material into the molds, the past speed detection result being detected in past by a speed sensor configured to detect the injection speed, wherein the controlling unit is configured to control the injection speed based on the past speed setting in a first process in the injecting process, and is configured to control the injection speed based on the past speed detection result in a second process after the first process in the injecting process.

2. The injection molding machine according to claim 1, wherein:
in the first process in a molding cycle performed in advance, the controlling unit is configured to control the injection speed based on the past speed setting until a pressure detection result of a pressure sensor configured to detect injection pressure reaches a predetermined upper limit value since start of the injecting process, and
in the second process in the molding cycle performed in advance, the controlling unit is configured to control injection pressure so that the pressure detection result is equal to or smaller than the predetermined upper limit value.

3. The injection molding machine according to claim 1, wherein:
the injecting device is configured to inject the material into the clamped molds by moving a screw in a barrel, the controlling unit is configured to generate a speed command of the screw based on the past speed detection result, and
the injection molding machine further comprises a command correcting unit configured to correct a position command of the screw based on the speed command.

4. The injection molding machine according to claim 3, wherein the command correcting unit is configured to correct the position command so that a speed detection result detected by the speed sensor approaches the past speed detection result.

5. The injection molding machine according to claim 4, wherein the command correcting unit is configured to correct the position command by adding, to the position command based on the past speed detection result, a product of the speed command of the screw based on the past speed detection result and a predetermined value.

6. The injection molding machine according to claim 5, wherein the predetermined value is set to be substantially equal to a deviation between the position command and a position feedback of the screw.

7. The injection molding machine according to claim 1, wherein the controlling unit is configured to control the injection speed in the injecting process by setting the past speed setting and the past speed detection result as speed settings of the injection speed.

8. The injection molding machine according to claim 1, wherein the controlling unit is configured to control the injection speed in the injecting process so that the injection speed follows the past speed setting and the past speed detection result.

9. The injection molding machine according to claim 1, wherein the controlling unit is configured to control the injection speed in the injecting process based on the past speed setting and the past speed detection result in a molding cycle in which a molded product is a non-defective product among molding cycles performed in advance.

10. The injection molding machine according to claim 1, further comprising a storage controlling unit configured to cause a storage unit to store the past speed setting and the past speed detection result in a molding cycle performed in advance.

11. A method of controlling an injection molding machine including an injecting device configured to inject a material into clamped molds and a controlling unit configured to control the injecting device the method comprising controlling, by the controlling unit, based on a past speed setting of an injection speed set in past and a past speed detection result in a molding cycle performed in advance, an injection speed in an injecting process through which the injecting device injects the material into the molds, the past speed detection result being detected in past by a speed sensor configured to detect the injection speed, wherein the controlling unit controls the injection speed based on the past speed setting in a first process in the injecting process, and controls the injection speed based on the past speed detection result in a second process after the first process in the injecting process.

* * * * *